United States Patent [19]

Albrecht et al.

[11] Patent Number: 4,480,192

[45] Date of Patent: Oct. 30, 1984

[54] OPTICAL PULSE CORRELATION MEASUREMENT

[75] Inventors: Georg F. Albrecht; Gerard Mourou, both of Rochester, N.Y.

[73] Assignee: The University of Rochester, Rochester, N.Y.

[21] Appl. No.: 349,396

[22] Filed: Feb. 16, 1982

[51] Int. Cl.³ .............................................. G02B 27/42
[52] U.S. Cl. .................................. 250/550; 324/77 K
[58] Field of Search .......................... 250/550, 237 R; 324/77 K, 96; 364/571, 525

[56] References Cited

PUBLICATIONS

Bradley et al., "Proc. IEEE", Mar. 1974, pp. 313, 316-319.

*Primary Examiner*—David C. Nelms
*Attorney, Agent, or Firm*—Martin Lukacher

[57] ABSTRACT

The temporal shape of optical pulses is measured over a wide dynamic range, for example, 10 orders of magnitude, by passing an optical signal corresponding to the autocorrelation function of the optical pulses through a variable attenuation filter, the position of which is a function of the attenuation. By plotting the attenuation of the filter in terms of the position thereof, against the duration of the temporal overlap of the pulses in a mixing crystal which produces the optical signal corresponding to the autocorrelation function, the temporal shape of the pulses is displayed.

15 Claims, 2 Drawing Figures

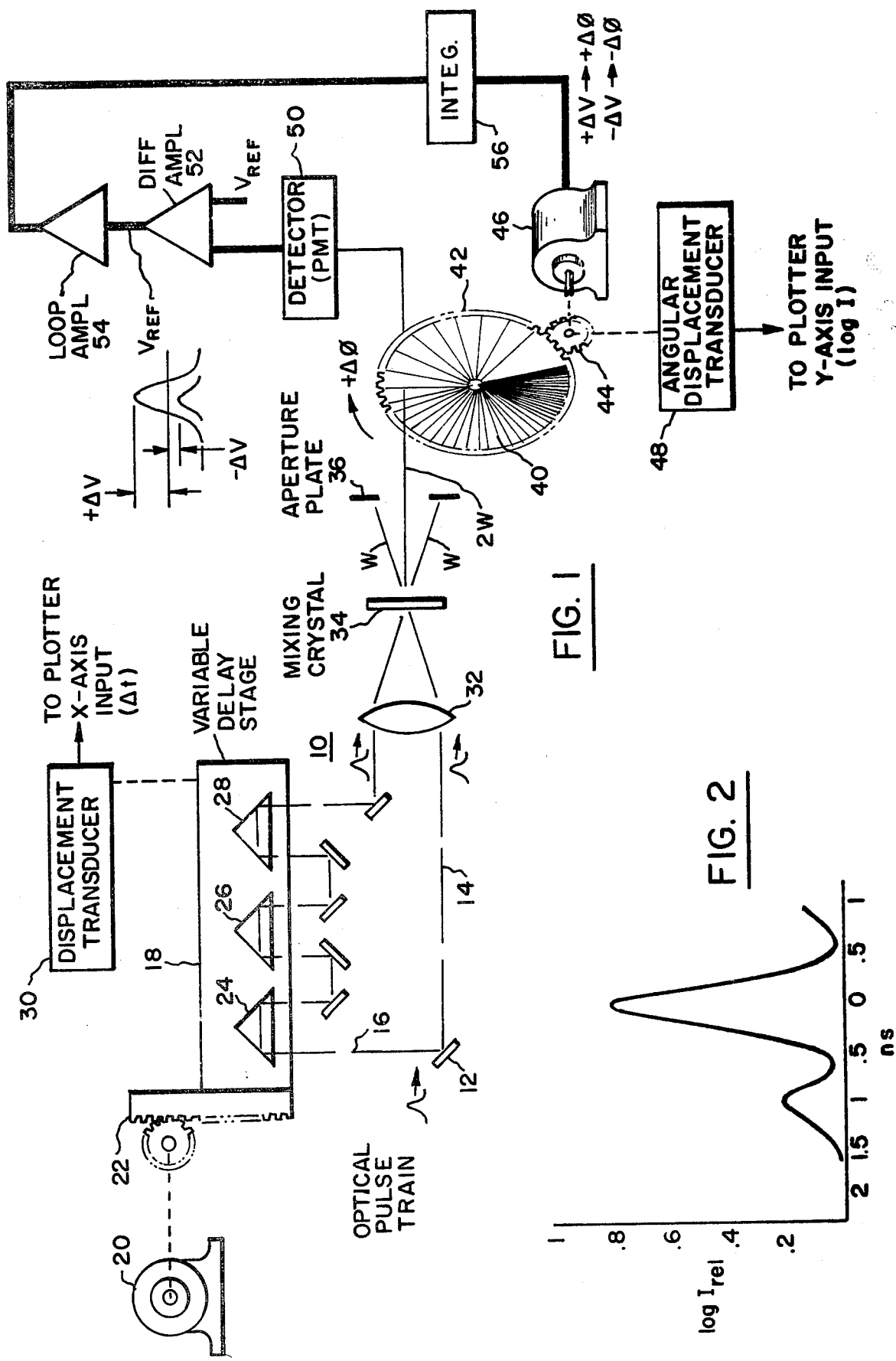

OPTICAL PULSE CORRELATION MEASUREMENT

The present invention relates to the measurement of short optical pulses and particularly to the measurement and display of the temporal shape of optical pulses from their correlation functions.

The invention is especially suitable for use in the measurement and display of short laser pulses having durations in the picosecond to a few nsec time domain. Such measurements may be used to show the shape of pulses from lasers which drive laser fusion apparatus so as to determine if the laser pulse, including its main pulse and any prepulses, are within specified parameters. The invention will be generally applicable for measurements of optical pulses in terms of their autocorrelation function.

Autocorrelation of short optical pulses in a nonlinear medium has heretofore been used to measure the duration of such pulses. Higher harmonic autocorrelation functions, by which is meant second order, third order and higher order autocorrelation functions can determine the intensity with respect to time (the temporal shape) and therefore the duration of repetitive optical pulses. Reference may be had to the following articles for further information respecting the measurement and display of optical pulses in terms of their autocorrelation function: E. P. Ippen and C. D. Shank, "Techniques for Measurement," in the text "Ultra Short Light Pulses," Volume 18 of the series "Topics in Applied Physics" published by Springer-Verlag, Berlin, Heidelberg, New York, p. 83 to 101; D. J. Bradley and G. H. C. New, "Ultra Short Pulse Measurements," Proceedings of the IEEE, 62, 3 p. 313 and 316 through 319, March 1974.

Background free methods of autocorrelation measurement which utilize the higher harmonic autocorrelation functions to the exclusion of the fundamental and lower harmonics of the pulses being measured have also been developed. (See H. Maier, W. Kaiser, and J. A. Giordmaine, "Intense Light Bursts in the Stimulated Raman Effect," Phys. Rev. Lett. 17, 1275 (1966); J. A. Armstrong, "Measurement of Picosecond Laser Pulse Widths," Appl. Phys. Lett. 10, 16 (1967); and R. C. Eckart and C. H. Lee, "Optical Third Harmonic Measurements of Subpicosecond Light Pulses," Appl. Phys. Lett. 15, 425 (1969). These correlation measurements are limited in dynamic range by the linear range of the detector (usually a photomultiplier tube) which reads the optical signal corresponding to the autocorrelation function of the pulses being measured. Accordingly, conventional autocorrelation measurement techniques are not especially suitable for measuring optical signals which may vary over a large dynamic range, for example, 10 or more orders of magnitude, as is the case with pulses from the driving oscillators of fusion lasers.

Accordingly, it is a principal object of the present invention to provide improved methods of and apparatus for correlation measurement and display of optical pulses which is not limited by the dynamic range or linearity of an optical detector.

It is a further object of the present invention to provide improved methods and apparatus for non-linear correlation measurement of short optical pulses which is capable of making measurements over a wide dynamic range of 10 or more orders of magnitude.

It is a still further object of the present invention to provide improved methods and apparatus for autocorrelation measurement and display of the temporal shape of short optical pulses automatically and with a sufficient degree of accuracy.

Briefly described, optical pulses which occur repetitively, may be measured in accordance with the invention by generating an optical signal corresponding to a higher order autocorrelation function of the intensity of the pulses. The intensity of the optical mixing-signal corresponding to the autocorrelation function is detected. The optical signal is also variably attenuated to maintain constant the intensity thereof as detected. The optical pulses are measured as a function of the amount of attenuation and their temporal shape may be displayed in accordance with the attenuation of the optical signal which corresponds to the autocorrelation function of the pulses with time.

The foregoing and other objects, features and advantages of the invention as well as the best mode and preferred embodiment for carrying out the invention, will become more apparent from a reading of the following description in connection with the accompanying drawings in which:

FIG. 1 is a schematic diagram of a system for autocorrelation optical pulse measurement in accordance with the invention; and FIG. 2 is a typical plot of the temporal shape of a pulse measured by the system shown in FIG. 1.

The second harmonic autocorrelation function of an optical pulse train is obtained with a background free non-linear correlator 10. The optical pulse beam is split by a partially reflective mirror 12 and transmitted along two paths 14 and 16. The path 16 is through a variable delay stage 18 which is linearly reciprocally moveable by means of a motor 20 and rack and pinion gear drive 22. In order to increase the delay for a given displacement of the stage, 3 prisms 24, 26 and 28 are mounted on a moveable slide of the stage which is driven by the motor 12 through the gears 22. The displacement and therefore the amount of delay is measured by a displacement transducer 30. A suitable transducer is manufactured by the Hewlett-Packard Co. of Palo Alto, Calif., for example, their model 24DCDT3000, which provides a direct voltage output. The output is applied to the X axis of a plotter on which the temporal shape of the pulses being measured is displayed.

The pulses transmitted along the beam paths 14 and 16 are variably delayed with respect to each other and are focused by a lens 32 on a mixing crystal 34. The mixing crystal may be a KDP crystal which provides the second harmonic autocorrelation function. An aperture plate 36 intercepts the fundamental beams (W) so that the output second harmonic optical signal (2W) from the autocorrelator is background free. The autocorrelation function is obtained since the delay of the pulses which arrive at the mixing crystal varies continuously. In other words, the temporal overlap of the pulses in the mixing crystal changes from pulse to pulse in the train.

While a second harmonic nonlinear correlator is described herein for purposes of providing the autocorrelation optical signal output, it may be desirable to use the third harmonic autocorrelation function of the optical pulses. In such event, a third harmonic autocorrelator such as described in G. Albrecht, A. Antonetti and G. Mourou, "Temporal Shape Analysis of Nd$^{3+}$: YAG Active Passive Mode-Locked Pulses," Opt. Commun. 40, 1, 59, December 1981, can be used.

The optical signal which corresponds to the second order autocorrelation function of the optical pulses is then passed through a variable optical attenuator 40. This attenuator is a variable neutral density filter. The neutral density of the filter is a function of its position. In the illustrated case, the filter is a circular variable neutral density filter wheel. Such filter wheels are available from Dyna-Optics of Laguna Niguel, Calif. 92677. The neutral density may vary linearly with rotation or angular position of the wheel. The wheel is rotated by a gear drive made up of a planetary gear 42 around the outer periphery of the filter wheel and a pinion 44. The pinion is driven by an electrical motor 46. This motor may be a direct current motor or a stepper motor, the amount of rotation of which is a function of the applied voltage thereto. The pinion 44 may be coupled to an angular displacement transducer 48. This transducer may be a potentiometer containing a source of voltage which provides an output corresponding to the angular displacement of the wheel ($\Delta\phi$). This output is applied to the Y axis input of a plotter. In other words, the displacement transducer 30 which indicates the delay or degree of temporal overlap providing the autocorrelation function and the angular displacement transducer which indicates the density and amount of attenuation of the optical signal are applied to orthogonal axes of the plotter. Inasmuch as the density is a logarithmic function of the intensity of the optical signal, the angular displacement transducer output is proportional to the logarithm of the intensity.

It can be shown that the intensity of the optical pulse being measured is directly proportional to the higher order correlation function (see the above-referenced article by Albrecht, Antonetti and Mourou). Accordingly, the position of the filter wheel and the attenuation inserted thereby is an indirect measure of the intensity of the optical pulse. It is this indirect measurement which enables the dynamic range of the measurement to be extremely wide (for example, over 10 orders of magnitude or more) and not limited by the linear range of a detector 50 which reads and converts the optical signal into an electrical output. This detector 50 may be a photomultiplier tube. Its output each pulse corresponds to the intensity thereof. The pulse intensity is compared with a reference level ($V_{ref}$) in a differential amplifier 52. The differential amplifier outputs a signal, $\pm\Delta v$ which is proportional to the difference between the amplitude of the optical signal and a constant amplitude represented by $V_{ref}$. The difference amplifier thus provides a control signal which is used to vary the attenuation of the optical signal by changing the position of the neutral density filter wheel so as to maintain the optical signal intensity as measured by the detector 50 constant. A feedback loop is used to drive the filter wheel 40.

A loop amplifier 54 and an integrating circuit 56 are contained in the feedback loop and connect the differential amplifier to the motor 46. The loop amplifier has a gain which is proportional to the repetition rate of the optical pulses; the higher the repetition rate the less gain is needed in the loop amplifier. The pulse signal is integrated in the integrating circuit 56 to provide the control voltage level $\pm\Delta v$ which results in an angular displacement of the filter wheel 40 of $\pm\Delta v$ which is directly proportional thereto. The loop drives the control signal to zero amplitude which occurs when the detector provides a constant output amplitude. This amplitude may, for example, be 100 millivolts which is used as $V_{ref}$.

The temporal shape of the optical pulses is plotted as a semi-log plot, for example, as shown in FIG. 2, on a plotter. The plot in FIG. 2 is a typical fusion laser oscillator pulse and shows a prepulse approximately one nanosecond from the main pulse.

Instead of a plotter, a CRT oscilloscope may be used. The screen of the CRT is focused on a film which is exposed to record the plot as the motor 20 drives the stage 18 back and forth to sweep the screen in the X or horizontal direction in response to the output of the displacement transducer 30 while the angular displacement as measured by the output of the angular transducer 48 provides the sweep in the Y direction. Accordingly, the plot will be automatically produced over a period of time, for example several seconds, as the stage 18 and filter wheel 40 execute their displacements. The linearity of the detector is not critical to the accuracy or dynamic range of the measurement. The only limitation on the system is the generation of parasitic signals in the mixing crystal. It has been found that a dynamic range of ten to eleven decades in amplitude can be obtained, and shown in the display in that it is the attenuating filter that solely determines the dynamic range of the apparatus.

Variations and modifications of the herein described apparatus within the scope of the invention as described herein directly and by reference to the article by Albrecht, Antonetti and Mourou, will, undoubtedly suggest themselves to those skilled in the art. Accordingly, the foregoing description should be taken as illustrative and not in a limiting sense.

We claim:

1. The method of measuring optical pulses which occur repetitively comprising the steps of generating an optical signal of varying intensity from said pulses corresponding to a autocorrelation function of the intensity of said optical signal, detecting the intensity of said pulses, variably attenuating said signal to maintain constant the intensity thereof as detected, and displaying the temporal shape of said pulses in accordance with the attenuation of said signal with time.

2. The method according to claim 1 wherein said generating step comprises the steps of nonlinearly mixing said pulses with different durations of temporal overlap, and said displaying step comprises the step of displaying the magnitude of attenuation which achieves said constant intensity for said different durations of temporal overlap.

3. The method according to claim 2 wherein said generating step is carried out by transmitting said pulses along two paths, variably delaying the pulses transmitted in one of said paths and the pulses transmitted in the other of said paths with respect to each other, mixing said pulses from both said paths in a nonlinear crystal to generate a harmonic thereof which provides said optical signal, varying the optical density of an optical filter through which said optical signal passes as said pulses are delayed with respect to each other to maintain the detected intensity of said optical signal constant, and displaying said optical density as a function of said delay to provide a measurement of the intensity profile of said pulses.

4. The method according to claim 3 wherein said density varying step is carried out by varying said density over a continuous range of densities in opposite senses in responses to said detected intensity.

5. The method according to claim 4 wherein said step of detecting the intensity of said optical signal is carried out by converting said optical signal into an electrical signal corresponding thereto, translating said electrical signal into a control signal the amplitude of which is a function of the difference in amplitude thereof and a reference amplitude, and changing the density of said optical fliter directly with the amplitude of said control signal.

6. The apparatus for the measurement of repetitive optical pulses which comprises means including a moveable, variable delay stage for providing an optical signal which is the autocorrelation function of said pulses, a moveably positionable optical attenuator through which said optical signal passes having an optical density which varies in accordance with the position thereof, photodetector means for providing an electrical signal corresponding to the intensity of said optical signal after passage thereof through said attenuator, means for varying the position of said attenuator to maintian constant the intensity of said optical signal as detected by said detector means, and means for plotting the position of said filter as a function of the position of said delay stage to display the temporal shape of said optical pulses.

7. The invention according to claim 6 wherein said optical signal providing means includes a nonlinear crystal through which said pulses pass and in which said pulses or higher harmonics thereof mix with varying temporal overlap which is a function of the position of said delay stage.

8. The invention according to claim 6 wherein said attenuator is a rotatable circular variable neutral density filter, the density of which presented to said optical signal is a function of the angular displacement thereof, first and second transducer means for providing first and second output levels proportional to the position of said delay stage and said angular displacement of said filter, respectively, said plotting means has orthogonal inputs and means for conjointly applying said first and second outputs to said orthogonal inputs of said plotting means to display said temporal shape of said pulses.

9. The invention according to claim 8 wherein said position varying means further comprises motor means for rotating said filter, a feedback loop between said photodetector and motor means including a difference amplifier having a reference input and for providing a feedback signal which corresponds to the difference between the amplitude of said photodetector output signal and the amplitude of said reference input.

10. The invention according to claim 9 wherein said feedback loop includes also an amplifier having a gain which is a function of the repetition rate of said optical pulses, and an integrating circuit.

11. Apparatus for measuring optical pulses which occur repetitively comprising means for generating an optical signal corresponding to a higher order autocorrelation function of the intensity of said pulses, means for detecting the intensity of said optical signal, means for variably attenuation said signal to maintain constant the intensity thereof as detected, and means for displaying the temporal shape of said pulses in accordance with the attenuation of said signal with time.

12. The apparatus according to claim 11 wherein said generating means comprises means for nonlinearly mixing said pulses with different durations of temporal overlap, and said displaying means comprises means for displaying the magnitude of attenuation which achieves said constant intensity for said different durations of temporal overlap.

13. The apparatus according to claim 12 wherein said generating means comprises also means for transmitting said pulses along two paths, means for variably delaying the pulses in different ones of said paths with respect to each other, means for mixing said pulses form each of said paths in a nonlinear crystal to generate a harmonic thereof which provides said optical signal, a variable density optical filter through which said optical signal passes, means for varying the density of said filter as said pulses are delayed with respect to each other to maintain the detected intensity of said optical signal constant, and means for displaying said optical density as a function of said delay to provide a measurement of the intensity profile of said pulses.

14. The apparatus according to claim 13 wherein said density varying means is operable to vary said density over a continuous range of densities in opposite senses in response to said detected intensity.

15. The method according to claim 14 wherein said means for detecting the intensity of said optical signal includes means for converting said optical signal into an electrical signal corresponding thereto, means for translating said electrical signal into a control signal the amplitude of which is a function of the difference in amplitude thereof and a reference amplitude, and means for changing the density of said optical filter in the path of said optical signal directly with the amplitude of said control signal.

* * * * *